(12) United States Patent
Baikie

(10) Patent No.: US 9,788,530 B2
(45) Date of Patent: Oct. 17, 2017

(54) PALATABLE, LONG-LASTING PET CHEW PRODUCT

(71) Applicant: Redbarn Pet Products, Inc., Long Beach, CA (US)

(72) Inventor: Jeff Baikie, Long Beach, CA (US)

(73) Assignee: Redbarn Pet Products, Inc., Long Beach, CA (US)

( * ) Notice: Subject to any disclaimer, the term of this patent is extended or adjusted under 35 U.S.C. 154(b) by 0 days.

(21) Appl. No.: 15/288,218

(22) Filed: Oct. 7, 2016

(65) Prior Publication Data

US 2017/0042123 A1 Feb. 16, 2017

Related U.S. Application Data

(62) Division of application No. 14/144,201, filed on Dec. 30, 2013, now abandoned.

(51) Int. Cl.
*A01K 15/00* (2006.01)
*A01K 15/02* (2006.01)

(52) U.S. Cl.
CPC .................................. *A01K 15/026* (2013.01)

(58) Field of Classification Search
CPC ..... A01K 29/00; A01K 15/025; A01K 15/026
USPC ......................................................... 119/710
See application file for complete search history.

(56) References Cited

U.S. PATENT DOCUMENTS

| D506,301 S | * | 6/2005 | Tepper | ........................... D1/120 |
| 8,074,609 B2 | * | 12/2011 | Adkins | ................ A01K 15/026 119/707 |
| 2004/0126462 A1 | * | 7/2004 | Tepper | ................. A01K 15/026 426/89 |
| 2007/0193531 A1 | * | 8/2007 | Anderson | ............ A01K 15/026 119/709 |
| 2011/0253062 A1 | * | 10/2011 | Adkins | ................ A01K 15/026 119/710 |
| 2011/0283955 A1 | * | 11/2011 | Axelrod | ............... A01K 15/026 119/710 |
| 2012/0234259 A1 | * | 9/2012 | Xu | ......................... A23K 40/20 119/710 |
| 2013/0305999 A1 | * | 11/2013 | Axelrod | ............... A01K 15/026 119/710 |
| 2013/0327279 A1 | * | 12/2013 | Prange | ................... A23K 50/42 119/710 |
| 2014/0255553 A1 | * | 9/2014 | Xu | ......................... A23K 1/003 426/92 |

OTHER PUBLICATIONS

String chandeliers. (Nov. 7, 2010). Retrieved from Ruffled: http://ruffledblog.com/diy-string-wedding-chandelier/.*

(Continued)

*Primary Examiner* — Monica Williams
*Assistant Examiner* — Aaron Rodziwicz
(74) *Attorney, Agent, or Firm* — Sunit Talapatra; Foley & Lardner LLP

(57) ABSTRACT

Disclosed herein are pet chew products and methods for making them. The methods include sewing together strips of material obtained from a bovine or from other animals to form an outline of a desired shape; interweaving additional strips of rawhide, animal penis or both under and on top of the strips forming an outline to form a pet chew product of desired shape and size; and drying the pet chew product to the desired moisture content.

8 Claims, 15 Drawing Sheets

(56) References Cited

OTHER PUBLICATIONS

Dingo Goof Balls. (Jun. 13, 2010). Retrieved Jan. 21, 2016, from Care-A-Lot Pet Supply: http://web. arch ive.org/web/201 0061319571 O/http://www.carealotpets.com/Products/Di ngo-Goof-Bal ls_2572b.aspx.

Dingo Goofballs Rawhide Dog Treats (Feb. 17, 2013) Retrieved Jun. 25, 2015, from Dr.s Foster Smith: www.drsfostersmith.com/product/prod_display.cfm?pcatid=25608.

* cited by examiner

PALATABLE, LONG-LASTING PET CHEW PRODUCT

CROSS-REFERENCE TO RELATED APPLICATIONS

This application is a Divisional Application of U.S. patent application Ser. No. 14/144,201, filed Dec. 30, 2013. The contents of which are herein incorporated by reference in its entirety.

FIELD

The present technology relates to a palatable and long-lasting pet chew product and methods for making and using the pet chew product.

BACKGROUND

Pets, such as dogs and cats, are known to bite, scratch, gnaw, lick and chew upon objects, particularly items such as natural bones or other objects such shoes, furniture and other household items causing unwanted damage to these items. As an answer to this problem, the pet industry has developed natural and synthetic chew toys which are manufactured in various shapes and sizes for dogs and other pets to chew on.

Some pets like to chew on hard materials such as bones and wood. However, such hard materials can break the pet's teeth or cause splinters which can affect the digestive track. Very young and old pets that may not have strong teeth prefer to chew on softer toys made from plastic, rubber or other elastomers. Although these toys are long lasting and durable, they fail to hold the pet's interest for long owing to the lack of flavor or texture.

Chew toys molded from consumable material such as chicken, meat, fish, natural grains etc. have gained popularity among pet lovers in recent years. Some of the edible chews, however, can be consumed very quickly and therefore fail to hold the pet's interest for long.

Attempts have also been made to develop toys that attract pets, such as providing toys in the various shapes and sizes so as to allow the pets to hold, pick, chew or even play with them, thus providing a means for maintaining interest in the toy. However, some of these pet chew toys can be easily swallowed and can be a choking hazard or even cause bowel obstruction in pets. Some of the chew toys available in the market tout benefits such as serving to distract the pet from chewing on other objects or to clean the teeth of pets, providing for dental hygiene and resulting in better breath.

While the above developments contribute to the art of providing pet chew products, there is still a need for improvement. The present invention thus contemplates a safe, palatable and long-lasting chew product which combines the art of chew products and toys and provides a pet chew product having improved design and functional characteristics.

SUMMARY

In one embodiment, a palatable, long-lasting pet chew product is provided, wherein the product includes a pet chew product which includes strips of material obtained from a bovine or from other animals, the strips being interwoven to form a substantially spherical pet chew with a hollow center.

In one embodiment, a method of forming a palatable, long-lasting pet chew product is provided, wherein the method includes sewing together strips of rawhide, animal penis or both to form an outline; interweaving strips of rawhide, animal penis or both under and on top of the strips forming an outline to form a substantially spherical pet chew product of desired circumference; and drying the pet chew product to the desired moisture content.

In another embodiment, a method of forming a substantially spherical pet chew product from strips of material obtained from a bovine animal, is provided, wherein the method includes fabricating flat shape strips of rawhide and/or animal pizzle; interweaving the strips over a spherical substrate in the length and number required to obtain a substantially spherical pet chew product; dehydrating the pet chew product in a dryer about 15 h at about 45° C.; removing the spherical substrate; drying the pet chew product again for about 4 h at about 45° C.; and sterilizing the pet chew product in a sterilizing oven for about 10 h at about 100° C.

In yet another embodiment, a method of preventing and/or reducing breath odor and plaque and tartar buildup in a pet is provided, the method comprising providing the pet with a pet chew product having

DETAILED DESCRIPTION

Figure 1:
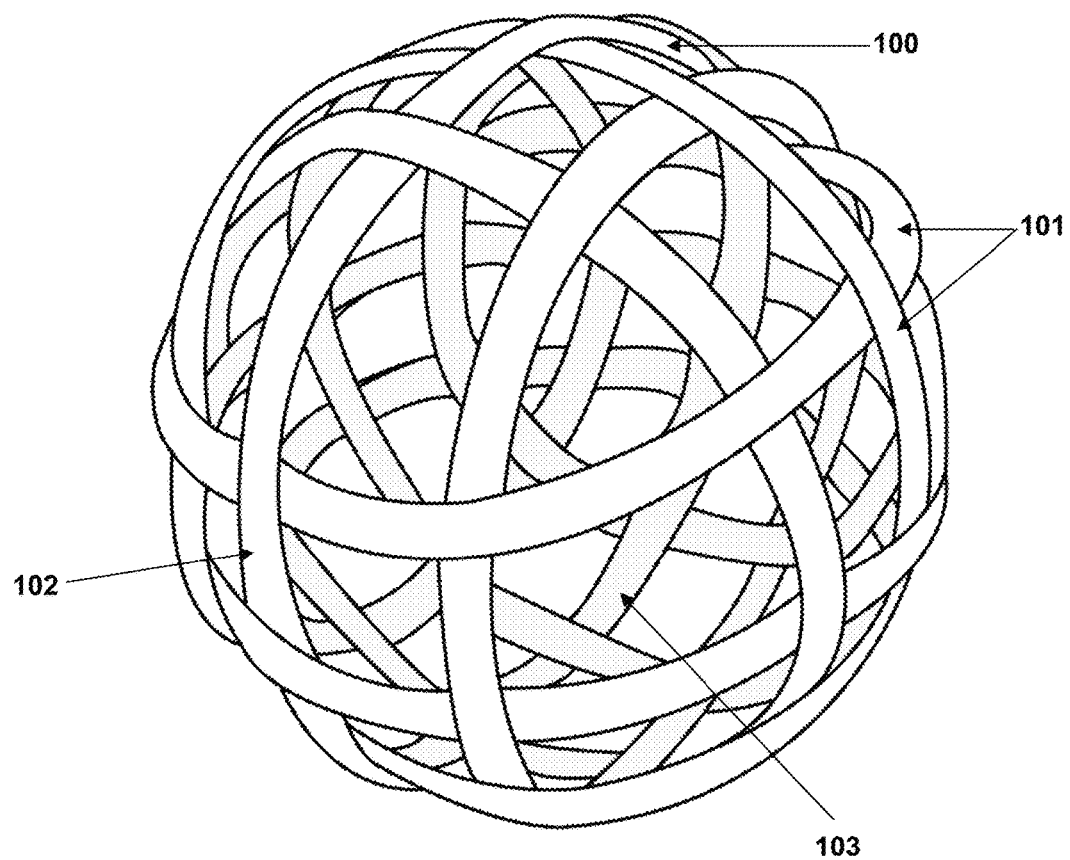
FIG. 1 is a schematic representation of one embodiment of the pet chew product wherein a plurality of strips of flat rawhide and/or a plurality of strips of steer penises are woven into a substantially spherical pet chew product.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). The description of the preferred embodiment as set forth herein, and as depicted in the drawings, is provided for illustrative purposes only.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The expression "comprising" means "including, but not limited to." Thus, other non-mentioned substances, additives, carriers, or steps may be present. Unless otherwise specified, "a" or "an" means one or more.

As used herein, the term "and/or" includes any and all combinations of one or more of the associated listed items.

Unless otherwise indicated, all numbers expressing quantities of ingredients, reaction conditions, and so forth, used in the specification and claims are to be understood as being modified in all instances by the term "about." Accordingly, unless indicated to the contrary, the numerical parameters set forth in the following specification and attached claims are approximations. Each numerical parameter should at least be construed in light of the number of reported significant digits and by applying ordinary rounding techniques. The term "about" when used before a numerical designation, e.g., temperature, time, amount, and concentration, including range, indicates approximations which may vary by (+) or (−) 10%, 5% or 1%.

As used herein, the term "animal" is used in a general sense and means a human or other animal including, without limitation, avian, bovine, canine, equine, feline, lupine, murine, ovine, and porcine animals, thus encompassing pets.

As used herein, a "pet" refers to a non-human domesticated animal or a companion animal including, without limitation, cats, dogs, mice, horses, birds, cows, rabbits, guinea pigs, ferrets, hamsters, chinchillas, gerbils, goats, sheep, donkeys, pigs, fish, and the like. In certain embodiments, the present invention concerns domestic pets such as dogs and cats. In some embodiments, the invention concerns dogs. However, although the present disclosure exemplifies dogs and cats, the invention can be adapted for use with other classes of pet animals.

"Pet chews" are products intended to be chewed by a pet for an extended period of time, being distinguished from "pet food" or "pet treats," which are consumed and digested in a relatively short period of time.

As used herein, the term "palatable" or "palatability" refers to the eating quality of chew products. For example, the palatable pet chew will likely have an agreeable or pleasant taste upon consumption and possess an appetizing appearance, odor and texture.

As used herein, the term "spherical" or "substantially spherical" is intended to include spherical or round structures and structures that closely resemble a circle. These include shapes that are a circle in the classical geometric sense, i.e., with a constant diameter, but also broadly includes any shape that is rounded, including a circle having an irregular diameter, an oval, an elliptical shape, or even the irregular oval shape.

Although some of the embodiments below are discussed with respect to a spherical pet chew product, the pet chew product can have any three-dimensional shape known in the art.

The present invention provides a new combination of ingredients and design which makes it possible to produce a chew product for pet consumption, which is palatable, long lasting, entertaining and can function as a dental hygiene product, a treat or toy.

Thus, in one embodiment, a palatable, long-lasting pet chew product is provided, wherein the product includes a pet chew comprised of strips of edible material which are interwoven to form a pet chew of desired shape and size.

In one embodiment, a pet chew product comprising strips of material obtained from a bovine or from other animals, the strips being interwoven to form a substantially spherical pet chew with a hollow center.

The pet chew is, in one embodiment, made from edible raw materials. Suitable edible raw materials used to make the pet chew product include, but are not limited to, dried or cured animal meat, chicken, pork, beef, duck, goose, turkey, poultry meat, fish, animal skin or hide, animal body parts such as penis or pizzle, viscera, liver, lung, heart, fat, snouts, ears, tripe, tendons, and knuckles, fruit, dried vegetable, carrot, sweet potato, potato, cellulose, hemp, coconut, grass, flax, and the like. In certain embodiments, the pet chew product comprises edible materials obtained from a bovine or from other animals. In some embodiments, the pet chew product includes rawhide or penis or both obtained from bovine animals, including, but not limited to bull, steer, cow, ox and the like or from other animals, such as the deer, elk, or even other deceased animals, or even animals that are legally hunted in the wild.

In some embodiments, the edible pet chew may be made of strips obtained from animal skin, for example rawhide or porkhide sheet. In some embodiments, the rawhide may be lightly bleached prior to use. In some embodiments, the rawhide strips are thin, chewy, malleable and long-lasting for chewing. In other embodiments, the edible pet chew may be made from bull, or steer, penises-called "pizzle" which have had the foreskin removed and which have been cleaned. In some embodiments, the pet chew product may be made of a combination of rawhide and pizzle. The pet chew is created by weaving together combinations of the preformed rawhide strips with fresh cleaned pizzle strips. Any suitable number of rawhide and/or pizzle strips can be used to produce the pet chew product. In one embodiment, about 50 to about 3, about 40 to about 5, about 30 to about 7, about 15 to about 9, or about 12 to about 10 strips are used for making the pet chew product and can be composed of any ratio of rawhide strips to pizzle strips.

The physical constituency of the pet chew product is such that it provides a long-lasting, palatable, nutritional and engaging chew for the pet. The pet chew product is designed to provide a chew with both high palatability and an extended chew time. The balance between these two properties depends among other factors, on the ratio of the number of strips of rawhide to the number of strips of pizzle. In general, the palatability of the end product will be greater with a higher percentage of penis strips, while the chew-time of the finished product will be longer with a higher percentage of rawhide strips. Thus, the ratio of rawhide to pizzle fraction can be altered to obtain a pet chew product having higher palatability or longer chew time or a balance of both properties. For example, in some embodiments the ratio of rawhide fraction to pizzle fraction is in the range of about 10:1, about 5:1, about 2:1, about 1:1, about 1:2, about 1:5 or about 1:10. In some embodiments, the ratio of rawhide fraction to pizzle fraction is in the range of about 2:1. In some embodiments, the ratio of rawhide fraction to pizzle fraction is in the range of about 1:1.

The rawhide and/or pizzle strips can be interwoven to form a pet chew of desired shape and size. The pet chew product may be designed to have any 3-dimensional shape known in the art, including, but not limited to longitudinal, spherical, football, triangular, square, rectangular, pentagonal, hexagonal, heptagonal, oval, elliptical, egg shaped, helical, knot shaped, disc shaped a sphere, cone, cylinder and the like. The pet chew product can be designed to provide a large surface area. Thus in one embodiment, the rawhide and/or pizzle strips are interwoven to form a substantially spherical shaped pet chew. The method of weaving and the number of strips of parts of the rawhide and/or pizzle that are woven together will depend upon the size of the substantially spherical pet chew product and the consistency of the strips that are desired for the final product.

In other words, multiple strips of rawhide, and/or multiple strips of the pizzle may be woven together to obtain the desired consistency of the pet chew. The number of the strips used is only limited by the size of the pet chew as desired for the final product. For example, if a spherical pet chew of a smaller diameter is desired, then the strips may be woven together, and cut to shorter lengths before being interwoven, so as to form a smaller, bite size, substantially spherical pet chews. On the other hand, if larger spherical pet chews are desired, then longer strips of the pet chew may be interwoven to form a substantially spherical shaped pet chew. In some embodiments, the strips are flat shaped. In other embodiments, the strips are rolled.

Standard weaving techniques known in the art can be used to weave the strips of rawhide and/or pizzle together. Generally, the strips are positioned to be equidistant from each other so as to form a uniform weaving pattern, but need not necessarily be so. A particular strip can be alternatively placed over and under the perpendicular strips to form a uniform weaving pattern. Suitable weaving patterns include, but are not limited to, a plain weave, a basket weave, a twill weave, a satin weave, a herringbone weave, a leno weave, a rep weave, a rib weave, a warp rib view, and velour weave as known to one skilled in the art, or a combination thereof. Exemplary weave patterns are disclosed for example, in U.S. Published Application No. 20040142142, which is incorporated herein by reference. In some embodiments, a single pet chew product may include any combination of two or more weave patterns. For example, the pet chew product may include a basket weave and a twill weave, a plain weave and a twill weave, a plain weave and a rib weave, a satin weave and a twill weave, a satin weave and a plain weave, a velour view and a twill weave, a leno weave and a rep weave, a herringbone weave and a plain weave, and the like. The weave pattern can be a sparse weave or a dense weave. The sparse weave pattern will result in larger openings in the pet chew product which is desirable for certain applications. The dense weave will result in smaller openings in the pet chew product which may be required for certain other applications.

In certain embodiments, rawhide or pizzle strips of shorter length can be sewn or seamed together with edible sewing material to form a pet chew of desired shape and size. Suitable edible sewing materials are known in the art and include, but are not limited to thread-like materials obtained from flesh, skin, guts, tendons, and whiskers of animals, such as cattle, pigs, horses, sheep, chickens, and the like. In some embodiments, the edible sewing material is catgut.

Both the rawhide and the pizzle can be cut in to desired shape and size. For example, depending on the desired width, the pizzle can be slit lengthwise to produce either about two to about four flat strips from each pizzle. Likewise flat, rather than rolled, rawhide material can be used to make rawhide strips of desired width and length.

The rawhide and pizzle strips can for example, have a width of about 0.01 mm, about 0.1 mm, about 0.5 mm, about 1 mm, about 5 mm, about 10 mm, about 15 mm, about 20 mm, or about 25 mm and all ranges between any two of these values or less than any one of these values. The width may be the width of the rawhide and pizzle strips in the wet state or in the dry state. In some embodiments, the rawhide and pizzle strips are about 1 mm to about 15 mm wide when dry. In some embodiments, the rawhide and pizzle strips are about 2 mm to about 8 mm wide when dry. In some embodiments, the rawhide and pizzle strips are about 4 mm to about 6 mm wide when dry.

The rawhide and pizzle strips can for example, have a length of about 0.01 cm, about 0.1 cm, about 0.5 cm, about 1 cm, about 5 cm, about 10 cm, about 15 cm, about 20 cm, about 25 cm, about 30 cm, about 40 cm, about 50 cm, about 60 cm, about 80 cm, about 100 cm, or about 150 cm, and all ranges between any two of these values or less than any one of these values. The length may be the length of the rawhide and pizzle strips in the wet state or in the dry state. In some embodiments, the rawhide and pizzle strips are about 10 cm to about 70 cm long. In some embodiments, the rawhide and pizzle strips are about 20 cm to about 60 cm long. In some embodiments, the rawhide and pizzle strips are about 30 cm to about 50 cm long, when dry. It is possible to take shorter length rawhide or pizzle strips and sew them together with catgut to produce longer strips of the raw material to use for weaving the substantially spherical pet chew product.

The diameter of the spherical pet chew can be adjusted to a suitable value depending on the desired size and use. For example, the substantially spherical pet chew product can have an diameter of about 1 cm, about 2 cm, about 3 cm, about 4 cm, about 5 cm, about 6 cm, about 7 cm, about 8 cm, about 9 cm, about 10 cm, about 11 cm, about 12 cm, about 13 cm, about 14 cm, about 15 cm, and all ranges between any two of these values or less than any one of these values. The diameter may be the diameter of the pet chew in the wet state or in the dry state. In some embodiments, the substantially spherical pet chew product has an diameter of about 2 cm to about 15 cm. In some embodiments, the substantially spherical pet chew product has an diameter of about 5 cm to about 12 cm. In some embodiments, the substantially spherical pet chew product has an internal diameter of about 7 cm to about 10 cm. The diameter can be measured as either internal diameter or external diameter. In one embodiment, the diameter is internal diameter of the pet chew product. In some embodiments, the diameter is the external diameter of the pet chew product. The spherical pet chew may be of even or uneven shape.

Referring now to the figures, the present technology provides a pet chew product that is effective, long-lasting and palatable. One embodiment of the product is seen in FIG. 1. As represented in FIG. 1, the pet chew product 100 has a spherical body comprised of strips 101 of rawhide and/or pizzle weaved together to form of an outer layer 102 and an inner layer 103. In this embodiment, a plurality of strips of rawhide and/or pizzle are alternatively positioned over and under each other and woven spherical pet chew product. These strips are woven together in the standard weaving process, generally known in the art, or woven from a series of these components, which are flat or otherwise formed into a strip or ribbon like consistency, as can be seen in FIG. 1. Generally, the components such as rawhide and pizzle are cleaned, dried and pre-cut in to long strands, strips or ribbons that can be easily woven, into the spherical configuration as shown in the drawing. Furthermore, the components are glued, seamed or sewn together using edible materials such as catgut, so as to add to its strength during the weaving process.

Figure 2:
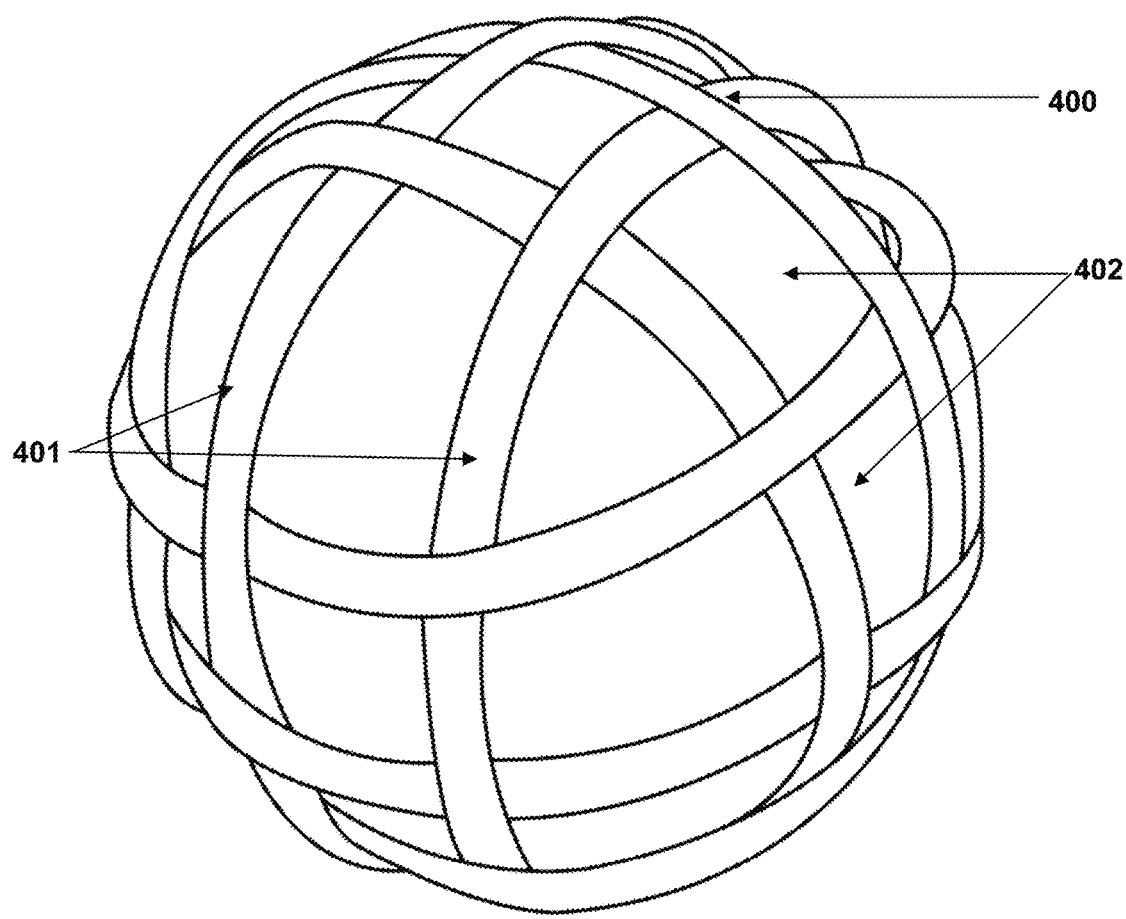
FIG. 2 is a schematic representation of one embodiment of the pet chew product wherein a plurality of strips of flat rawhide or a plurality of strips of steer penises are woven into a substantially spherical pet chew product.

FIG. 2 shows another embodiment of the pet chew product comprising a substantially spherical pet chew product 400 made from bleached rawhide strips or pizzle strips 401 woven in a simple weave pattern. The figure depicts a chew product having a sparse weave with large openings 402.

Figure 3:
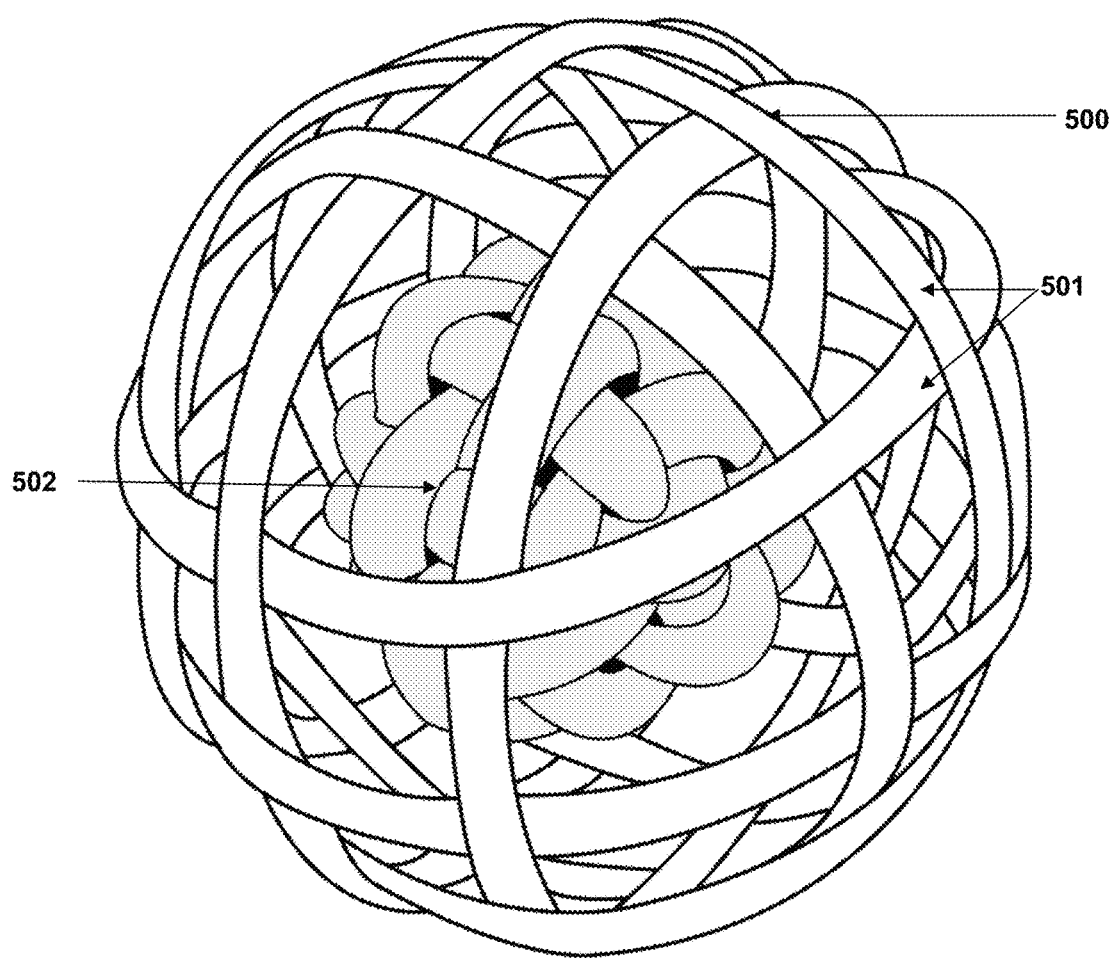
FIG. 3 is a schematic representation of one embodiment of the pet chew product wherein a plurality of strips of flat rawhide and/or a plurality of strips of steer penises are woven into a substantially spherical pet chew product comprising a treat embedded therein.

FIG. 3 shows another embodiment of the pet chew product comprising a substantially spherical pet chew product 500 made from bleached rawhide strips 501 and enclosing a treat 502.

Figure 4:
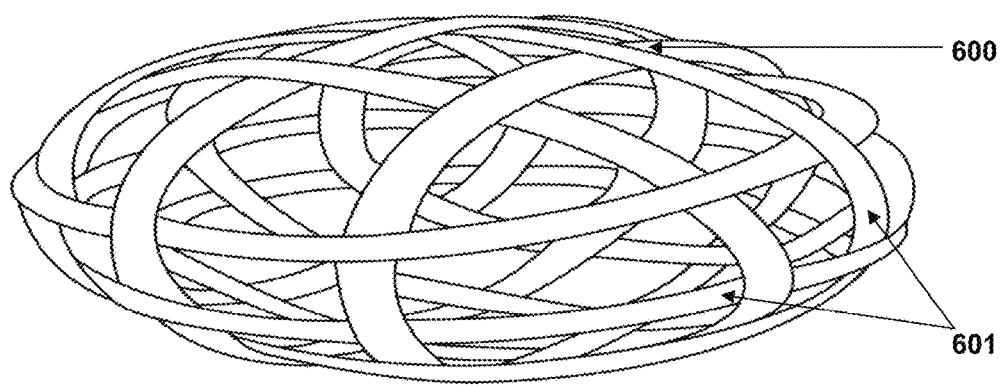
FIG. 4 is a schematic representation of one embodiment of the pet chew product wherein a plurality of strips of flat rawhide and/or a plurality of strips of steer penises are woven into a substantially football shaped pet chew product.

FIG. 4 shows another embodiment of the pet chew product comprising a substantially football shaped pet chew product 600 made from bleached rawhide and/or pizzle strips 601.

Figure 5:
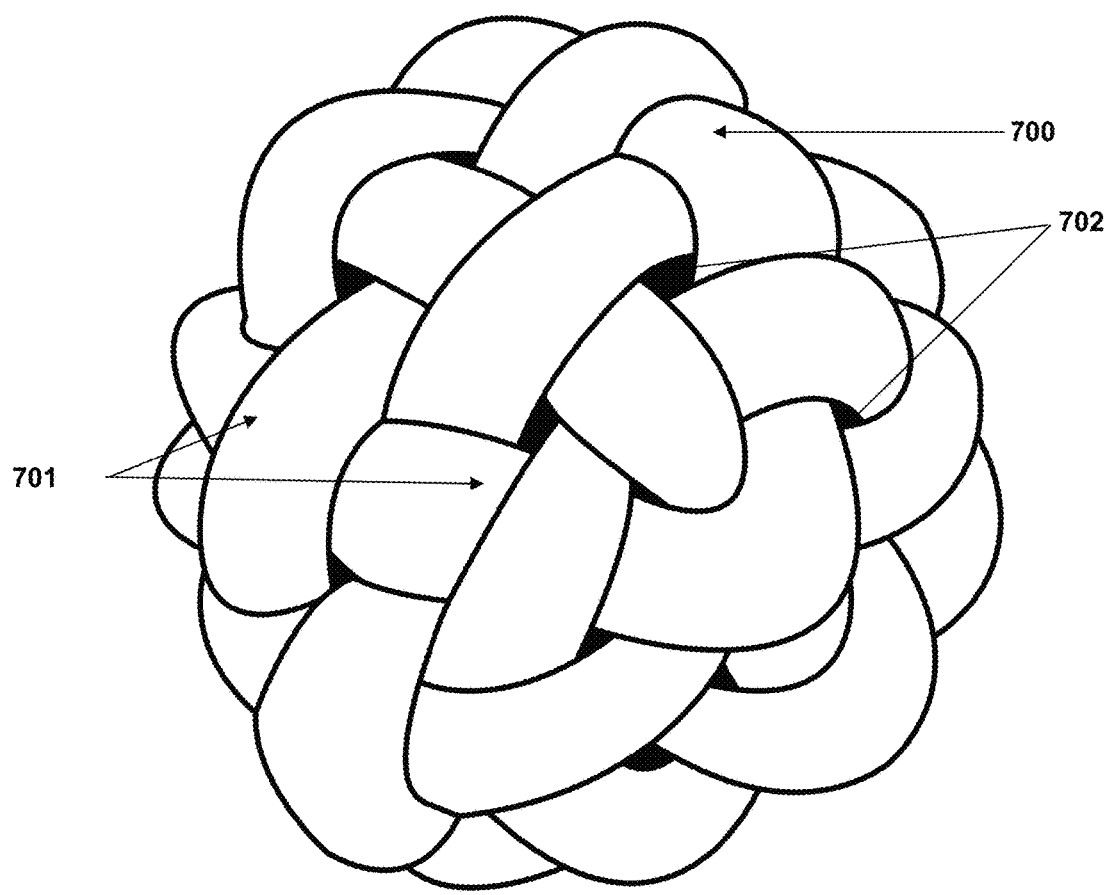
FIG. 5 is a schematic representation of one embodiment of the pet chew product wherein a plurality of strips of flat rawhide and/or a plurality of strips of steer penises are woven into an uneven shaped pet chew product.

FIG. 5 shows another embodiment of the pet chew product comprising a pet chew product 700 having an uneven surface made from bleached rawhide strips and/or pizzle strips 701 woven in a dense weave pattern and having small openings 702.

Figure 6:
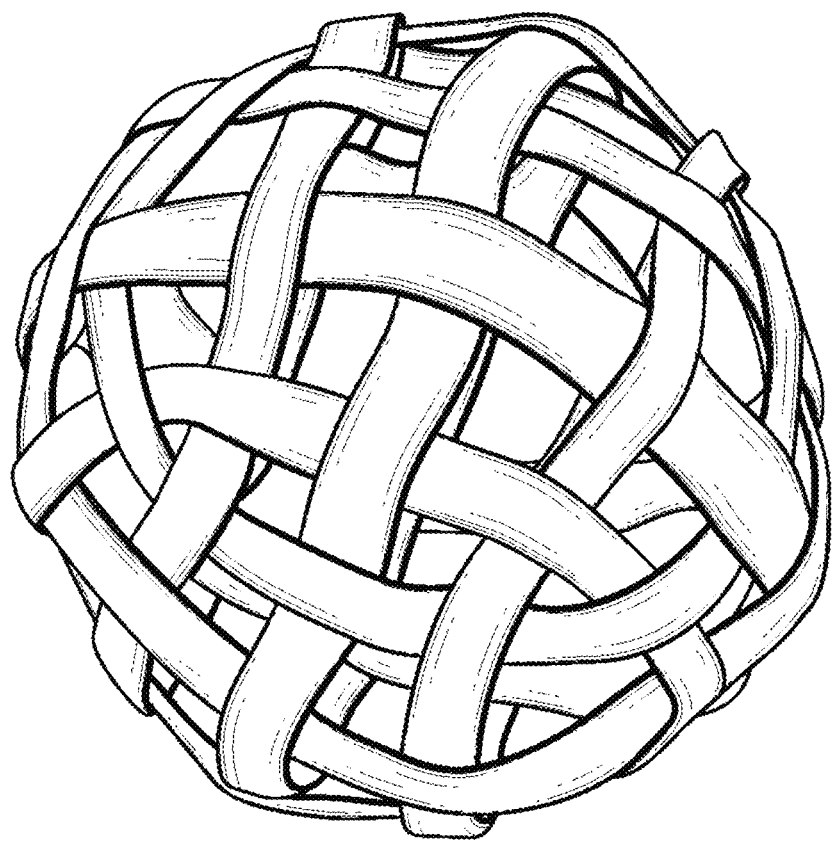
FIG. 6 is a perspective view of one embodiment of the pet chew product.

FIG. 6 is a perspective view of one embodiment of the pet chew product. The figure represents an embodiment wherein the strips of the pet chew product are woven in a plain weave pattern using broad strips of rawhide and/or pizzle.

Figure 7:
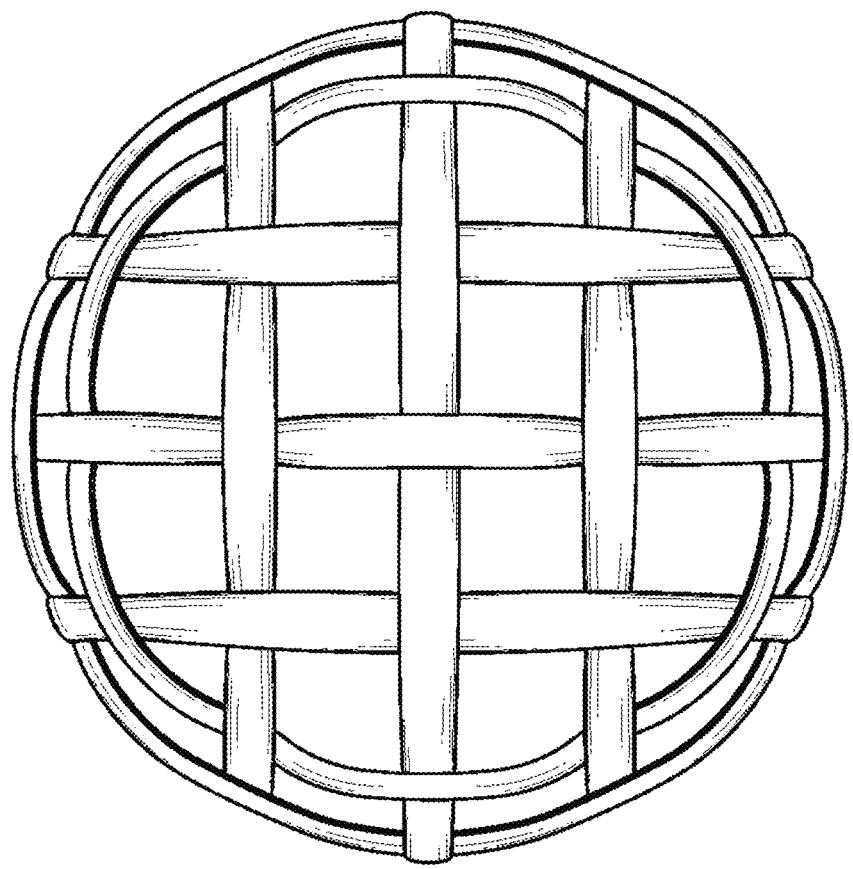
FIG. 7 is a front view of the embodiment of FIG. 6, wherein the rear, left, right, top and bottom views are identical to the front view.

FIG. 7 is a front view of the embodiment of FIG. 6, wherein the rear, left, right, top and bottom views are identical to the front view.

Figure 8:
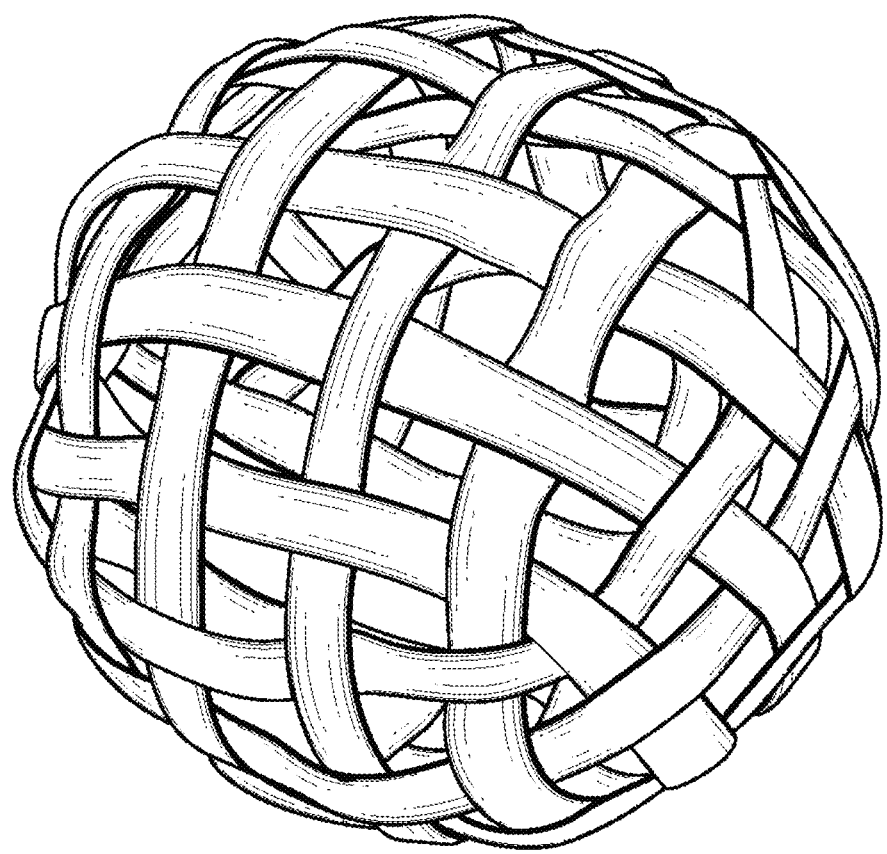
FIG. 8 is a perspective view of another embodiment of the pet chew product.

FIG. 8 is a perspective view of another embodiment of the pet chew product. The figure represents an embodiment wherein the strips of the pet chew product are woven in a plain weave pattern using narrow strips of rawhide and/or pizzle.

Figure 9:
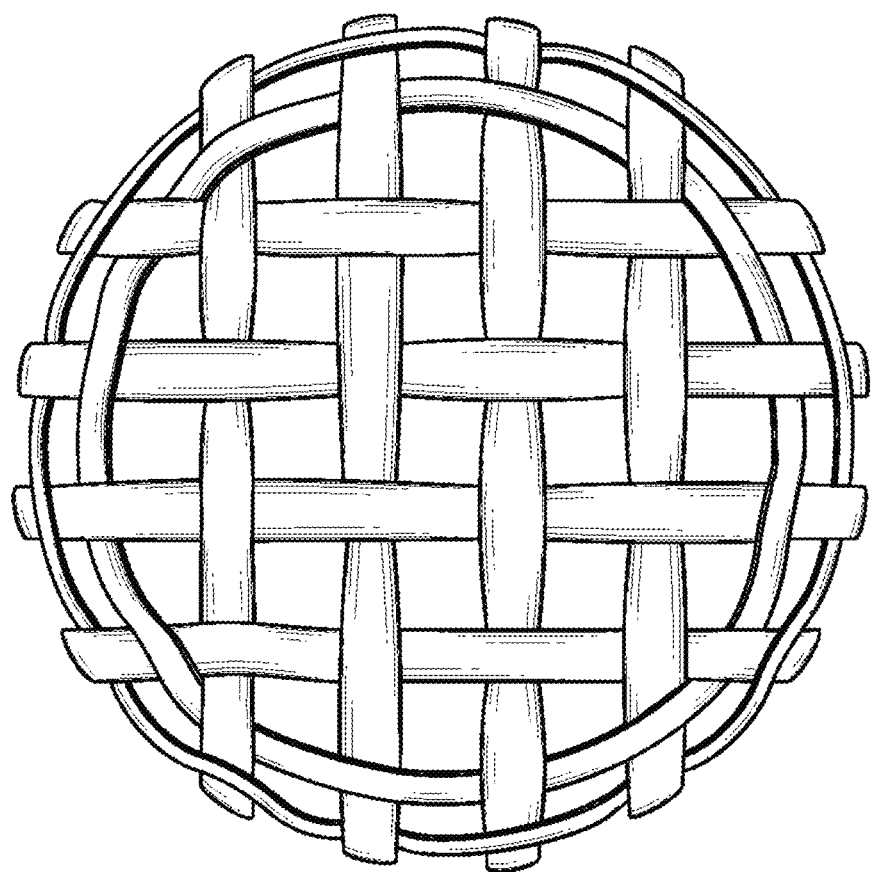
FIG. 9 is a front view of the embodiment of FIG. 8, wherein the rear, left, right, top and bottom views are identical to the front view.

FIG. 9 is a front view of the embodiment of FIG. 8, wherein the rear, left, right, top and bottom views are identical to the front view.

Figure 10:
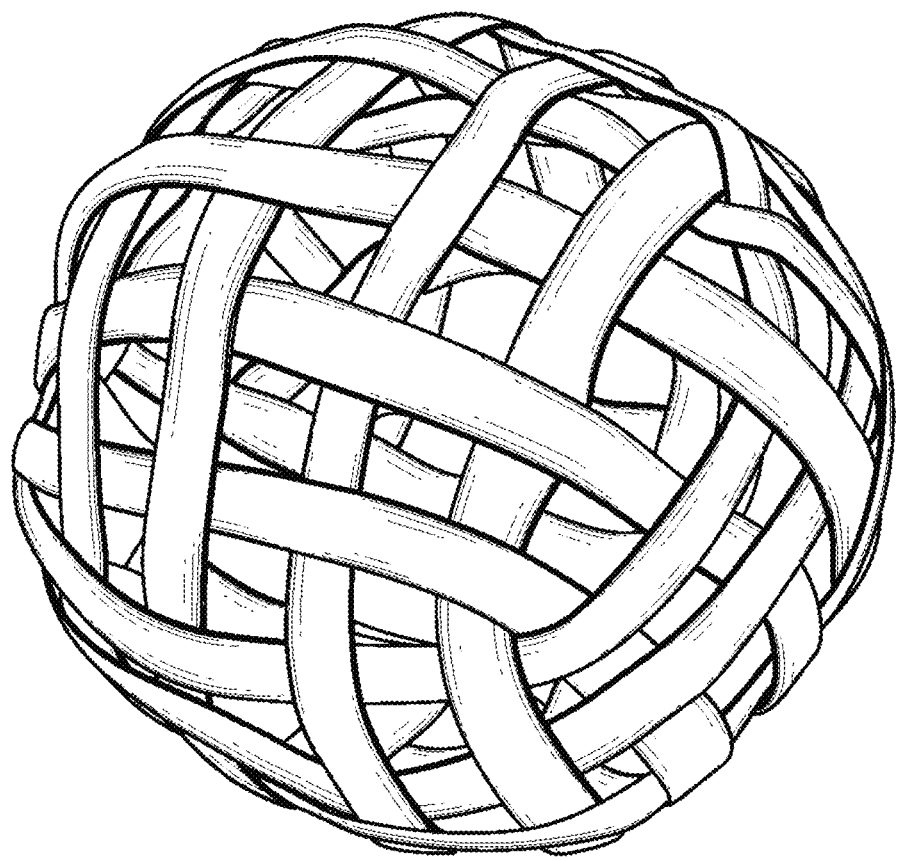
FIG. 10 is a perspective view of yet another embodiment of the pet chew product.

FIG. 10 is a perspective view of yet another embodiment of the pet chew product. The figure represents an embodiment wherein the strips of the pet chew product are woven in a basket weave pattern.

Figure 11:
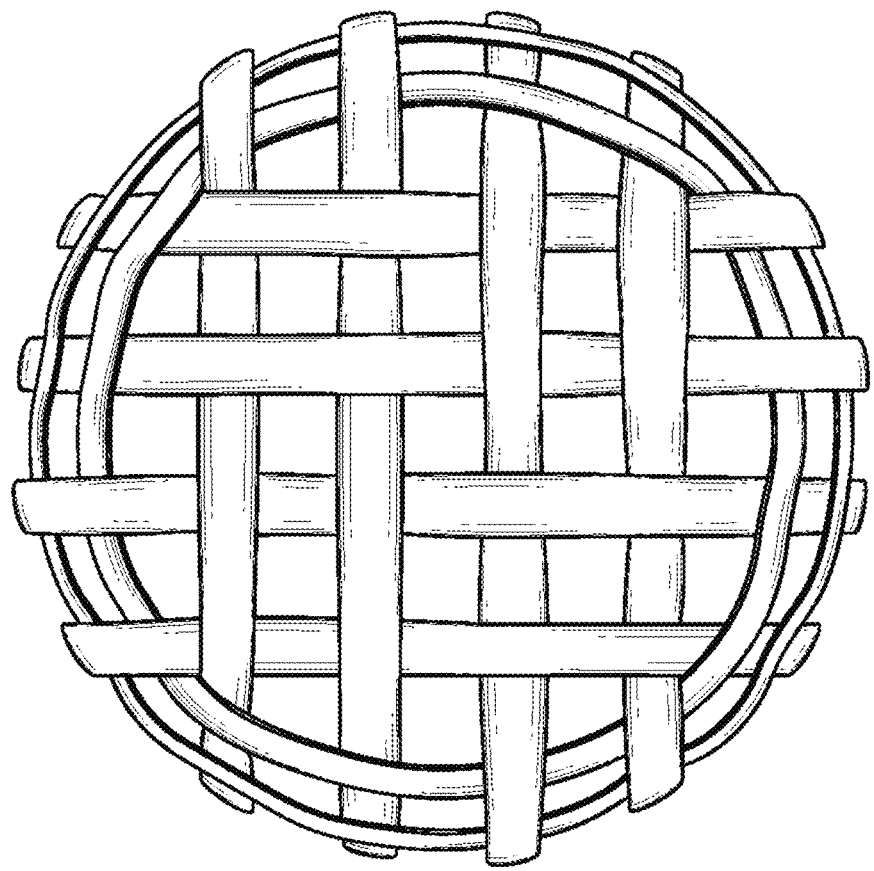
FIG. 11 is a front view of the embodiment of FIG. 10, wherein the rear, left, right, top and bottom views are identical to the front view.

FIG. 11 is a front view of the embodiment of FIG. 10, wherein the rear, left, right, top and bottom views are identical to the front view.

Figure 12:
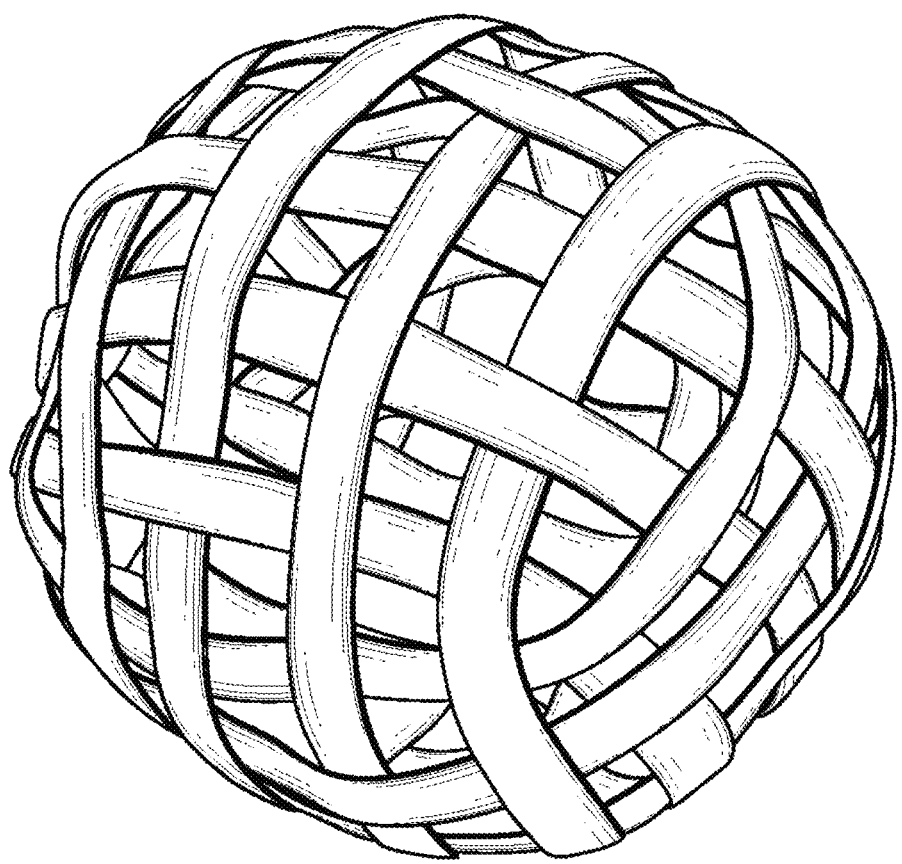
FIG. 12 is a perspective view of still another embodiment of the pet chew product.

FIG. 12 is a perspective view of still another embodiment of the pet chew product. The figure represents an embodiment wherein the strips of the pet chew product are woven in a satin weave pattern.

Figure 13:
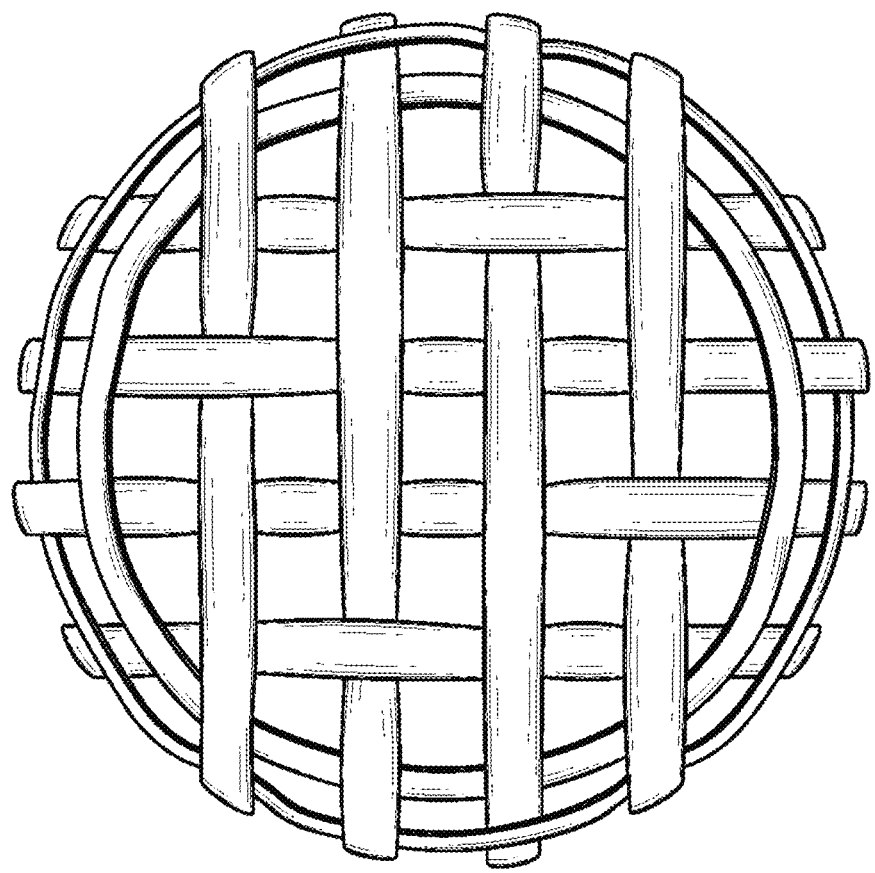
FIG. 13 is a front view of the embodiment of FIG. 12, wherein the rear, left, right, top and bottom views are identical to the front view.

FIG. 13 is a front view of the embodiment of FIG. 12, wherein the rear, left, right, top and bottom views are identical to the front view.

Figure 14:
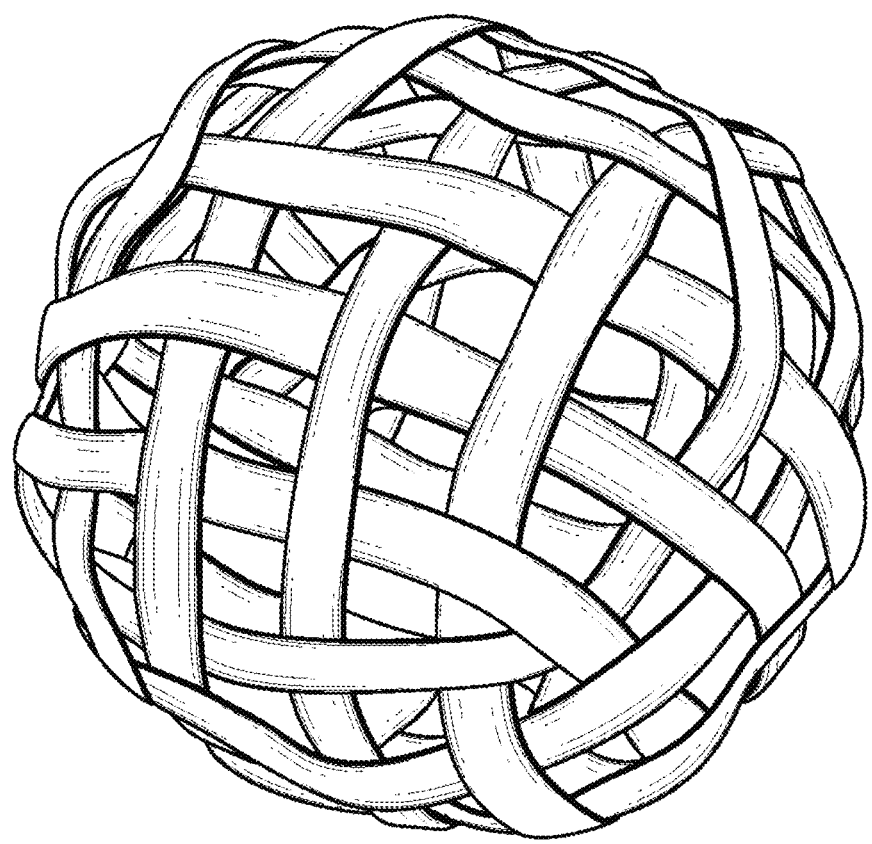
FIG. 14 is a perspective view of another embodiment of the pet chew product.

FIG. 14 is a perspective view of another embodiment of the pet chew product. The figure represents an embodiment wherein the strips of the pet chew product are woven in a twill weave pattern.

Figure 15:
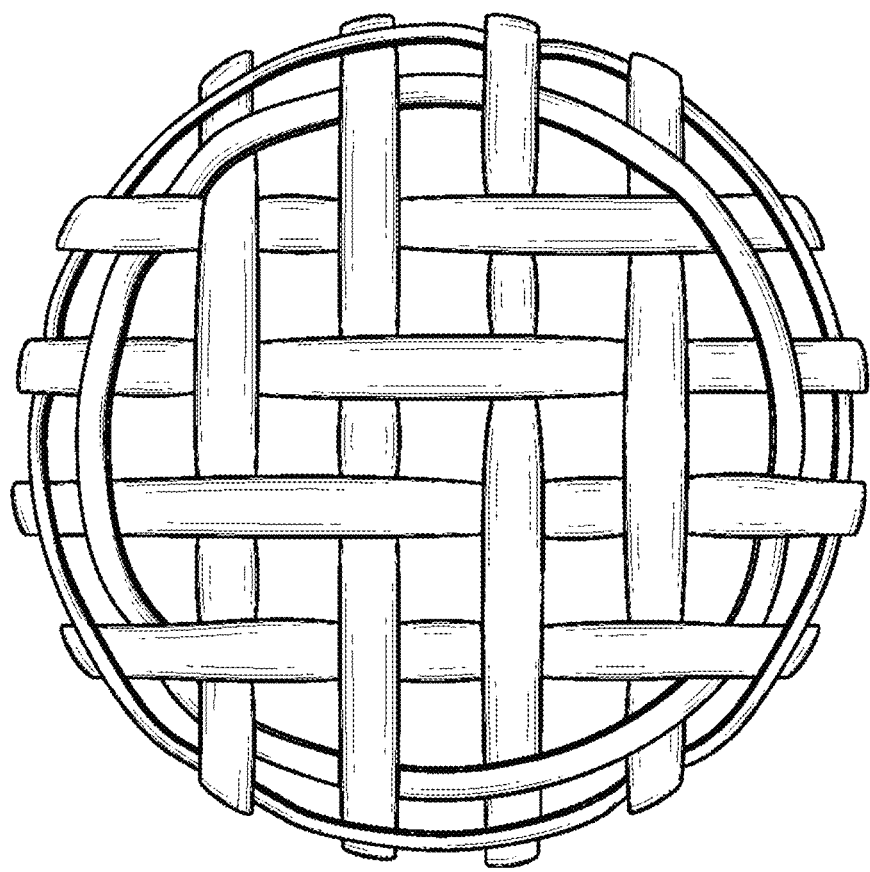
FIG. 15 is a front view of the embodiment of FIG. 14, wherein the rear, left, right, top and bottom views are identical to the front view.

FIG. 15 is a front view of the embodiment of FIG. 14, wherein the rear, left, right, top and bottom views are identical to the front view.

Variations or modifications to the subject matter of this invention may occur to those skilled in the art upon review of the disclosure as provided herein. Such variations, if within the spirit of this development, are intended to be encompassed within the scope of the claims as set forth herein. For example, the strands of rawhide and penis may not only come from the bull, steer, cow or other bovine, but could also be obtained from other animals, such as the deer, elk, or even other animals that may become deceased, as at a zoo, game park, or even animals that are legally harvested in the wild.

In addition to the rawhide and or pizzle strips, the pet chew products may further include additives, including food grade or generally recognized as safe ("GRAS") by the United States Food and Drug Administration, including, but not limited to, preservatives, nutrients, humectants, odor enhancers, acids (e.g., citric acid, malic acid, fumaric acid), antioxidants (e.g., ascorbic acid, ascorbyl palmitate, tocopherols), flavorings, texturizers, vitamins, minerals, fibers, insoluble fibers, gums (e.g., xanthan), starches, cellulose, buffers, colorants, emulsifiers (e.g., lecithin, polyethylene glycol, polyoxyethylene sorbitan monooleate), sorbitol, alcohols, spices, syrups, milk, milk powder, dispersants, stabilizers, solubilizing agents, palatability enhancers (8P enhancers for dogs and 9P or 9M for cats sold by SPF Diana (France)), and the like, or mixtures thereof. These additives, if present, can be incorporated in the pet chew product at a concentration in the range of about 0.001 wt %, about 0.01 wt %, about 0.02 wt %, about 0.05 wt %, about 0.1 wt %, about 0.5 wt %, about 1.0 wt %, about 2 wt %, about 5 wt %, about 10.0 wt %, about 15.0 wt %, about 20.0 wt %, and ranges between any two of these values or less than any one of these values.

These additives may be added during the preparation and processing of the strips used to produce the pet chew products or during the preparation of the final pet chew.

The preservatives utilized in the present methods include any suitable preservatives known in the art, including food grade preservatives. The preservatives may function as mold inhibitors or antioxidants. Suitable preservatives include, but are not limited to, sodium acid pyrophosphate, potassium pyrophosphate, sodium benzoate, calcium benzoate, potassium benzoate, potassium sorbate, sodium sorbate, calcium sorbate, sodium acetate, calcium acetate, sodium diacetate, calcium diacetate, sodium propionate, calcium propionate, potassium propionate, niacin, citric acid, sorbic acid, ascorbic acid, propionic acid, paraaminobenzoic acid esters (parabens) and the like or mixtures thereof. Exemplary antioxidants include butylated hydroxyanisol (BHA), butylated hydroxytoluene (BHT), and tertiary butyl hydroquinone (TBHQ), tocopherols, rosemary extract, propyl gallate and other food grade antioxidants. These preservatives may be used to preserve the cleaned raw material or strips of raw material prior to forming the pet chew product.

In some embodiments, the pet chew product may include a nutrient such as vitamins, minerals, enzymes, phytonutrients, animal fats, lecithin and the like or mixtures thereof.

In some embodiments, the pet chew product may include a suitable humectant known in the art, including, but are not limited to, glycerin, corn syrup, betaine, propylene glycol, sugar, high fructose corn syrup, honey, glycerol, sorbitol, xylitol, maltitol, whey, propylene glycol, dextrose, fructose, aloe vera, and the like, and mixtures thereof.

In another embodiment, a shelf-stable pet chew product is provided, wherein the product retains about 80% to about 90% of its original dimension over a 24 month period is provided. In yet another embodiment, a shelf-stable pet chew product incorporating vitamins and nutrients is provided. In certain embodiments, a shelf-stable pet chew product incorporating a therapeutic agent is provided. In some embodiments, a shelf-stable pet chew product incorporating an edible treat is provided.

In certain embodiments, the pet chew product provides a long lasting, slow release vehicle for therapeutic agents. In some embodiments, the rawhide or pizzle strips can be being impregnated with a therapeutic agent so as to dispose the agent upon being chewed by the pet. As the pet gnaws or chews on the chew product, the therapeutic agent is slowly released and consumed by the pet. Suitable therapeutic agents which can be incorporated in to the pet chew product are known in the art and include, but are not limited to, antimicrobial agents, analgesics, anti-inflammatory agents, local anesthetic agents, biofilm inhibiting agents, dentinal desensitizing agents, odor masking agents and the like. In some embodiments, the therapeutic agent is a dental agent. In other embodiments, the therapeutic agent is an antimicrobial agent.

Some of the pet chew toys are developed to provide additional functions such a dental care or toys for entertainment and exercise. Dental care chews are designed to provide a surface upon which the pet's teeth may be scraped so as to reduce tartar which results from the thickening and hardening of the plaque. In some embodiments, the pet chew product functions as a dental hygiene product. In some embodiments, the strips of the pet chew product function as a dental floss to reduce/prevent the build-up of plaque, calculus or tartar in the mouth of the pet.

In one embodiment, a method of preventing and/or reducing breath odor and plaque and tartar buildup in a pet is provided, the method comprising providing the pet with a palatable, long-lasting pet chew product which includes strips of material obtained from a bovine or from other animals, the strips being interwoven to form a substantially spherical pet chew with a hollow center.

In some embodiments, the woven pet chew product provides improved reduction or removal of tartar, plaque or calculus buildup compared to other pet chew products know in the art. Both the composition and the design of the pet chew product are such that they aid in cleaning of teeth. For example, rawhide and pizzle both have mild abrasive action on the tartar or plaque. Moreover, the surface and edges of the woven strips and the hollow center makes it possible to provide scrubbing or scraping action for the pet's teeth whenever the pet chews on the product. This aids in reducing the build-up of tartar, plaque or calculus on the surface of the teeth, thereby improving the dental hygiene of the pet. The woven pet chew product thus provides dental hygiene functionality which other pet chew products know in the art, such as for example a solid ball-like pet chew product would not provide.

Play chew toys are designed to encourage pets to play and exercise. Some pet chew products function as a holder for treats and provide additional incentive to the pet to play and exercise.

The pet chew product can be designed to function as a pet treat holder. Thus, in certain embodiments, the hollow center of the pet chew product incorporates an additional edible or chewable treat or snack. For example, the edible treat may be positioned inside the spherical pet chew product and is released on the pet chew product being chewed open by the pet. Suitable edible treats are known in the art and include, but are not limited to, biscuits, rawhide chips, donuts, sticks, strips, twists, small and large bones, knotted bones, kibbles, rawhide products, and other dog and cat snacks, and the like. In some embodiments, a pet toy can be incorporated in to the cavity of the spherical pet chew product such that the toy is released on the pet chew product being chewed open by the pet.

In one embodiment, a method of forming a palatable, long-lasting pet chew product is provided, wherein the method includes sewing together strips of rawhide, animal pizzle or both with catgut to form an outline; interweaving additional strips of rawhide, animal penis or both under and on top of the strips forming an outline to form a substantially spherical pet chew product of desired circumference; and drying the pet chew product to the desired moisture content.

In some embodiments, the primary raw material is rawhide which has been lightly bleached, split into thin sheets and cut into long strips and/or animal penis or pizzle which has been cleaned and cut in to long strips.

In the production of the chew product, the rawhide strips and pizzle strips precut to the desired length and having somewhat matching diameter are obtained. A spherical substrate, such as e.g., a balloon, ball or bag, is inflated to desired dimensions and sealed. The spherical mold or substrate can include other heat resistance flexible materials that may or may not stretch during filling and inflation. The balloon is shaped to the desired shape by placing air or other gas or liquid within. The inflated balloon, ball or bag is then used as a mold upon which the desired number of strips is then placed side-by-side and spread around the circumference of the spherical substrate in an overlapping manner and tied together utilizing an edible catgut material. Additional strips are then weaved under and over the top of the initial strips and are sewn together by edible catgut fraction.

Alternatively, a balloon or other spherical object could be filled with water to achieve the desired dimensions, frozen and the resulting frozen ice ball used as a substrate. This technique can also be used to prepare a pet chew product of other shapes.

In some embodiments, the finished pet chew product is dried using suitable drying methods known in the art, e.g., air-drying, heat drying, vacuum drying, freeze-drying, spray-drying or combinations thereof. In some embodiments, the drying includes heat drying the product. In some embodiments, the finished product is placed in a dryer or an oven and the product is dried for a suitable period of time at a suitable temperature. For example, the finished product can be dried for about 1 min to about 60 min, about 1 h to about 5 h, about 5 h to about 8 h, about 8 h to about 15 h, about 15 h to about 25 h, about 25 h to about 40 h, and ranges between and including any two of these values. In some embodiments, the finished product is dried for about 10 h to about 20 h. In some embodiments, the finished product is dried for about 15 h.

In some embodiments, the finished product is heated to a suitable temperature, e.g., at about 300° C. or below, about 200° C. or below, about 100° C. or below, at about 80° C. or below, at about 50° C. or below, at about 45° C. or below, at about 40° C. or below, at about 35° C. or below, at about 30° C. or below, at about 25° C. or below, or at about 20° C. or below, and ranges between and including any two of these values. In some embodiments, the finished product is heated to about 45° C. or below. In one embodiment, the finished product is dried for about 15 h at about 45° C.

The initial drying of the chew product can be conducted at lower temperatures so as to avoid sudden shrinkage of the product. Before or after the finished product is dried, the inflated substrate balloon, ball or bag is popped and the broken substrate material is recovered by removing it from existing holes or openings in the ball.

After initial drying and removal of the substrate material, the product may be subjected to additional drying by placing it in an oven or a dryer at a suitable temperature for an additional period of time. In some embodiments, the pet chew product may be dried for an additional period of over 1 hour at a temperature of above 30° C. In some embodiments, the dried pet chew product may be sterilized in a sterilization oven for over 2 h at a temperature of above 40° C. In some embodiments, the pet chew product may be dried for an additional period of about 4 h at about 45° C.

The dried or dehydrated product can then be sterilized by methods known in the art. For example, the dried product may be placed in sterilization oven for a suitable period of time at a suitable temperature. Suitable sterilization times and temperature are as described for the drying step. In some embodiments, the dried pet chew product may be sterilized in a sterilization oven for over 4 h at a temperature of above 80° C. In some embodiments, the dried pet chew product may be sterilized in a sterilization oven for over 7 h at a temperature of above 90° C. In some embodiments, the dried pet chew product may be sterilized in a sterilization oven for about 10 h at about 100° C.

In one embodiment, a method of forming a pet chew product from strips of material obtained from a bovine animal, comprising: fabricating strips of rawhide and/or animal pizzle; interweaving the strips over a spherical substrate in the length and number required to obtain a substantially spherical pet chew product; dehydrating the pet chew product in a dryer about 15 h at about 45° C.; removing the substantially spherical substrate; drying the pet chew product again for about 4 h at about 45° C.; and sterilizing the pet chew product in a sterilizing oven for about 10 h at about 100° C.

The pet chew product can be dried under suitable conditions so as to obtain specific moisture content in the end product. In some embodiments, the pet chew product is dehydrated to a shelf-stable moisture level. For example, the product may be dehydrated to moisture content of about 5% or below, about 10% or below, about 15% or below, about 20% or below, about 25% or below, about 30% or below, or about 35% or below, and ranges between and including any two of these values. In some embodiments, the pet chew product is dehydrated to a moisture content of below 15%. In some embodiments, the pet chew product is dehydrated to a moisture content of below 12%. In some embodiments, the pet chew product is dehydrated to a moisture content of below 10%.

In some embodiments, the method further includes packaging the pet chew product using suitable packaging methods known in the art using suitable packaging materials. As used herein, the term "packaging material" means any component of packaging in which pet chew product is contained. Packaging materials include, for example, thermoplastic packaging films and foils, and wrapping or bags formed therefrom; coated or uncoated paper webs and sheets as well as bags or cardboard boxes; thermoformed punnets; wax or film coatings applied directly to the product or to a container; multilayer packaging constructions; printed coatings, embossed indicia, labels placed on or in packaging or on product, adhesives used to close or seal packaging or adhere labels and the like thereto; ink printed directly on product, directly on packaging, or on a label that is then adhered to packaging. In some embodiments, the packaging includes aseptic packaging. In some embodiments, the product is individually packed in plastic bags and then collectively packed in bulk boxes. The packaged product can be stored or transported for commercial distribution and sale.

The pet chew product is all natural, has excellent chew time and palatability. The uneven surface of the ball shaped product provides a chew which can be rolled, held between the teeth or chewed effectively. The pet chew product can be a source of nutrients, such as proteins and fiber to the pets, is non-allergic and retain their freshness, texture and taste over a long period of time. The pet chew product is designed to be fun and also has functional benefits as described above. The pet chew product can be marketed in the dry form, and does not require any expensive storage or transport conditions such as extensive chilling. The pet chew product is readily available for consumption and entertainment of pets such as dogs.

The pet chew product of the invention has a significantly longer chew time than comparable animal treats having different constitution. Although not bound by theory, it is hypothesized that the pet or the animal spends a significant amount of time consuming the various strips that form the product. As a result, the chew product keeps the pet occupied for a long time because it takes an extended period for the pet to completely consume the chew. In some embodiments, the present pet chew product has a chew time that is about 1.5 times, about 2 times, about 3 times, about 5 times, about 7 times or about 10 times more than the comparable pet chew products known in the art, such as e.g., a solid pet chew, a molded pet chew, a extruded pet chew or a nylabone and the like.

In one embodiment, a shelf-stable pet chew product obtained using the methods described herein is provided. A product has shelf stability when it is safe for consumption and maintains an acceptable quality when stored at room temperature. Some of the factors which contribute to the deterioration of foods include microbial, enzymatic, chemical and physical factors. The pet chew product of the present invention is stable against all these factors. In some embodiments, the pet chew product is more stable than other pet chew products known in the art, for example, a solid pet chew product or an unwoven pet chew product.

The shelf-stable product can be shelf-stable with developmentally appropriate textures, color, taste and nutrition profiles. Accordingly, the shelf stability can be measured as a function of loss of moisture over a period of time, decay or degradation over a period of time, loss of nutritional value over a period of time, loss of flavor over a period of time, color change over a period of time and so on and so forth. Degradation can be assessed by a variety of means, including appearance (e.g., color, texture), moisture content, and the like. Thus, in some embodiments, product prepared according to inventive process undergo less than 20%, 15%, 10%, 7%, 5%, 3%, 2%, or 1% degradation during the long storage periods identified above.

In some embodiments, the pet chew product maintains its integrity and natural characteristics over a long period of time and is resistant to degradation and decay. In one embodiment, the pet chew product retains about 80%, about 90% or about 100% of the initial dimensions over a period of about 24-36 months. In some embodiments, the pet chew product retains the dimensionally stable indefinitely. In some embodiments, the pet chew product remains resistant to degradation and decay for over 12 months. In some embodiments, the pet chew product remains resistant to degradation and decay for over 24 months. In some embodiments, the pet chew product remains resistant to degradation and decay for over 36 months. In some embodiments, the pet chew product remains resistant to degradation and decay for over 60 months.

The present invention, thus generally described, will be understood more readily by reference to the following examples, which are provided by way of illustration and are not intended to be limiting of the present invention. The examples are intended to illustrate the various embodiments of the present technology.

EXAMPLES

The following examples are set forth as illustrative of this invention:

Example 1

Three 30 cm long and 10 mm wide pieces of bleached rawhide split 5 mm thick were cut from the underside part of a cattle hide. The pieces weighed about 15 g each in the wet state. A 100 cm long bull penis was cleaned by removing the foreskin and outer grizzle material and cut in to about 30 cm long and about 10 mm wide strips. The penis strips had a weight of 30 g each. Three strips of bleached rawhide were then placed flat side by side on one side of a balloon having a diameter of about 10 cm and the ends of each strips were sewed together at the top with catgut fraction. Six strips of bull penis were then weaved together using a typical basket or a rug weaving technique until the entire penis fraction and/or rawhide fraction had been woven to form a substantially spherical pet chew. The ends of the six strips were again sewed together with catgut fraction.

The wet finished product was about 10 cm in diameter and weighed 225 g. It was placed in a in a hot air dryer dehydrator. It was dried for 15 h at 45° C. The product was removed from the oven and the balloon was popped and removed from in between the openings of the pet chew product. Drying was continued at 45° C. for an additional 4 h. The dried product was sterilized in a sterilizing oven for 10 h at 100° C. The final product has a diameter of about 10 cm, weight of about 32 g and a moisture level of 10%.

A large quantity of pet chew products was made with the above technique and feeding studies were conducted to determine the acceptability of the weave and more importantly the resulting chew-time of the treat. The resultant pet chew product was found to have a chew time exceeding 2 h even on relatively large dogs and the palatability was readily acceptable to all of the animals tested.

Example 2

Ten 20 cm long and 5 mm wide pieces of bleached rawhide split 5 mm thick were cut from the underside part of a cattle hide. Four strips of bleached rawhide were then placed flat side by side on one side of a balloon having a diameter of about 8 cm and the ends of each strips were sewed together at the top with catgut fraction. Six strips of bleached rawhide strips were then weaved together using a typical twill weaving technique until the entire penis fraction and/or rawhide fraction had been woven to form a substantially spherical pet chew. The ends of the six strips were again sewed together with catgut fraction.

The wet finished product was about 8 cm in diameter. It was placed in a in a hot air dryer dehydrator. It was dried for 12 h at 45° C. The product was removed from the oven and the balloon was popped and removed from in between the openings of the pet chew product. Drying was continued at 45° C. for an additional 4 h. The dried product was sterilized in a sterilizing oven for 10 h at 100° C. The final product has a diameter of about 8 cm, and a moisture level of 10%.

Example 3

The procedure of example 2 can be repeated using pizzle strips instead of rawhide strips, and a football shape instead of a sphere. The product can be dried to a moisture level of about 10%.

Example 4

The procedure of example 1 can be repeated using six rawhide strips and three pizzle strips. The product can be dried to a moisture level of about 10%.

Example 5

The procedure of example 2 can be repeated using elk hide strips instead of cattle hide. The product can be dried to a moisture level of about 10%.

It is to be understood that while the invention has been described in conjunction with the above embodiments, that the foregoing description and examples are intended to illustrate and not limit the scope of the invention. Other aspects, advantages and modifications within the scope of the invention will be apparent to those skilled in the art to which the invention pertains.

What is claimed is:

1. A method of forming a substantially spherical pet chew product from strips of material obtained from a bovine animal, comprising:
   (a) fabricating flat shape strips of rawhide and/or animal pizzle;
   (b) interweaving the strips over a substantially spherical substrate in the length and number required to obtain a substantially spherical pet chew product;
   (c) dehydrating the pet chew product in a dryer 15 h at 45° C.;
   (d) removing the substantially spherical substrate;
   (e) drying the pet chew product again for 4 h at 45° C.; and
   (f) sterilizing the pet chew product in a sterilizing oven for 10 h at 100° C.

2. The method of claim 1, wherein the spherical substrate is a balloon.

3. The method of claim 1, wherein the spherical substrate is an ice ball.

4. The method of claim 1, wherein the strips have a length of about 5 cm to about 100 cm.

5. The method of claim 1, wherein the strips have a width of about 1 mm to about 20 mm.

6. The method of claim 1, wherein the number of strips used to form the pet chew product is about 9.

7. The method of claim 1, wherein the substantially spherical pet chew product has a diameter of about 5 cm to about 20 cm.

8. A pet chew product obtained by the method of claim 1.

* * * * *